Jan. 8, 1963

E. KODRA 3,072,317

MULTI-STAGE COMPRESSOR

Filed Feb. 24, 1960

INVENTOR:
ESPER KODRA

BY Joseph Januszkiewicz

ATTORNEY 3,072,317
MULTI-STAGE COMPRESSOR
Esper Kodra, Michigan City, Ind., assignor to Joy Manufacturing Company, Pittsburgh, Pa., a corporation of Pennsylvania
Filed Feb. 24, 1960, Ser. No. 10,730
6 Claims. (Cl. 230—182)

This invention relates to a multi-stage compressor and more particularly to piston rings associated with the different pressure stages of such a compressor.

As is well known a multi-stage compressor receives a quantity of a fluid which is compressed from a low first pressure, such as atmospheric air, to an intermediate pressure and thereafter compresses the fluid from the intermediate pressure to a higher pressure. Such compression is frequently accomplished in individual cylinders, chambers or compressor stages having reciprocating pistons with piston rings thereon. Consequently, the mean pressure in each stage of the compressor is substantially different and since such pressures react on the piston rings of each stage the wear characteristics of the piston rings for each stage differ substantially. Heretofore it has been the generally accepted practice to replace the piston rings as each set wears out. With different wear characteristics for the piston rings of the individual compressor stages such replacement requires taking a compressor out of service at times when one set of rings is in perfect operating condition. This practice has been especially prevalent with non-lubricated cylinders which use carbonaceous piston rings without any outside source of lubrication. In order to reduce the amount of time the compressor is inoperative due to frequency of piston ring changes, piston rings are provided of different carbon grades for the separate stages, resulting in substantially equal wear rates. But the carbon grade chosen is limited by the piston ring diameter and thickness. The piston rings of the low pressure cylinder are commonly substantially larger in diameter than the piston rings of the high pressure cylinders; and, since size is the limited factor in choosing a carbon grade, the carbon grade of the low pressure cylinder is the basis of establishing the wear rate. Size is so critical because the recent developments in carbon processing that improve wear life involve special and multiple baking and/or impregnating processing and as the size of the carbon stock increases it becomes extremely difficult to bake uniformly and to impregnate uniformly, thus being economically unfeasible. But in the size range of the piston rings used in the high pressure cylinders the above processing techniques are feasible and thus there are a greater number of carbon grades available that will give substantially less wear at the higher piston ring loadings.

Accordingly one object of this invention is to provide a new and improved multi-stage compressor having piston rings in the individual stages thereof with balanced wear characteristics.

A further object of this invention is to provide a new and improved multi-stage compressor having piston rings of a certain wear characteristic for one stage which balance the wear characteristics of the piston rings of another stage.

A specific object of this invention is to provide a new and improved multi-stage compressor in which the piston rings in a higher pressure stage are usable for the same lengths of time as the piston rings in a lower pressure stage.

A more specific object of this invention is to provide a new and improved multi-stage compressor in which the wear characteristics of non-lubricated piston rings of a low stage match the wear characteristics of non-lubricated piston rings in a higher stage.

A more specific object of this invention is to provide a new and improved multi-stage compressor having compression chambers with different operating pressures wherein carbonaceous piston rings are mounted on pistons reciprocable in the chambers so that the piston rings of greater hardness are mounted in the compression chambers of higher pressures.

These and other objects of this invention will become more apparent when taken in conjunction with the following detailed description of a preferred embodiment thereof and the following drawings, in which.

Figure 1:
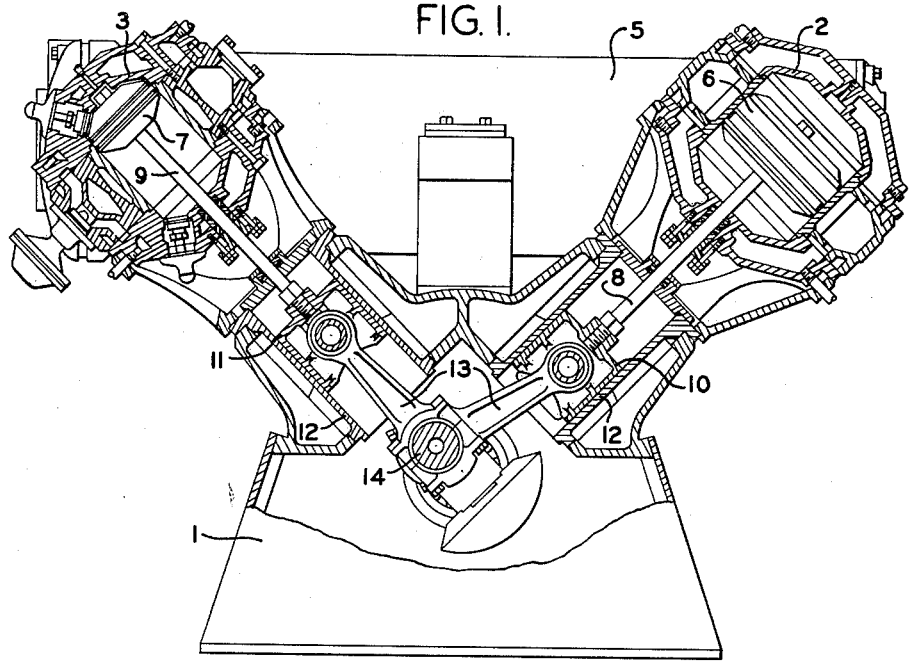
FIG. 1 is a cross sectional view of a multi-stage compressor constructed in accordance with the principles of this invention.
Figure 2:
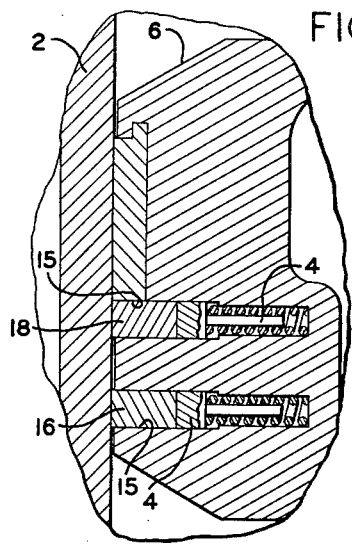
FIG. 2 is an enlarged sectional view of a portion of the piston ring and the adjacent cylinder wall in the low pressure stage.
Figure 3:
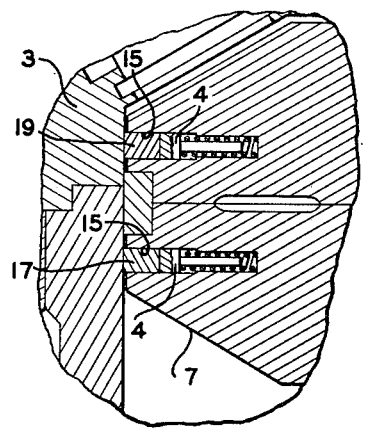
FIG. 3 is an enlarged sectional view of a portion of the piston ring and the adjacent cylinder wall in the high pressure stage.

In the illustrative embodiment of the invention shown in FIGS. 1–3 inclusive, there is shown a compressor having a base frame 1 on which are mounted at opposite sides of a vertical plane and approximately 45° from a horizontal plane a first stage or low pressure cylinder 2 and a second stage or high pressure cylinder 3, respectively. A crankshaft 14 is suitably rotatably mounted on the frame 1 which is driven by any conventional power means (not shown). Connecting rods 13 operatively connect the crankshaft 14 to crossheads 10 and 11, respectively, each of which is reciprocably guided in crosshead guides 12 suitably journaled on the frame 1 at approximately 45° from a horizontal plane. Elongated piston rods 8 and 9 are connected between the crossheads 10 and 11 and pistons 6 and 7, which are slidable in cylinders 2 and 3, respectively, said cylinders forming chambers for the respective pistons. With such construction, as the crankshaft 14 is rotated, the pistons 6 and 7 reciprocate in the cylinders 2 and 3 or chambers. The chamber or that portion of the cylinder above the piston is commonly referred to as the head end whereas the other end of the chamber is referred to as the rod end.

The cylinders 2 and 3 are connected by an intercooler 5 through suitable valving mechanisms in a manner well known in the art. Fluid is supplied to the low pressure cylinder 2 from an intake line to an intake closure valve (not shown) for controlling the admission of fluid to the cylinder 2 in a manner well known and accordingly not shown. The fluid is delivered to the head end of the low pressure cylinder 2 wherein it is compressed and discharged through discharge valves, not shown, to intercooler 5 wherein the compressed fluid is cooled. The compressed fluid then flows from the intercooler into the high pressure cylinder 3 wherein the fluid is compressed again and thereafter the fluid is discharged into a receiver. Inasmuch as the structure heretofore described is well known in the art and does not constitute this invention further description thereof is not believed to be necessary.

The pistons 6 and 7 have circumferential grooves 15 for receiving expansible segmental piston rings 16–19 inclusive, which slidably engage the bore of the cylinders 2 and 3 and which prevent leakage of fluid past the piston whereby the fluid in the cylinders 2 and 3 is compressed. The segmental piston rings 16–19 inclusive are biased outwardly by spring means 4. Under normal operating conditions the piston rings 16–19 wear due to the friction engagement of the rings with the walls of the cylinders 2 and 3. In addition to the outward spring biasing action by spring means 4, the pressures developed in the respective head ends of the cylinders or chambers or as in double acting compressors, compression also occurs on the rod end of the cylinder thus creating in all events a pressure differential across the piston rings so that a resultant higher pressure compressed fluid flows through the clearance between the piston ring grooves 15 and past the piston rings 16–19 inclusive, thereby getting behind the piston rings 16–19 inclusive and thereby exerting an outward force on the piston rings 16–19 inclusive. This outward force provides a further reactive force that augments the spring biasing action to create the wearing action on the piston rings.

As an example of the principle hereinabove described where the pressure in the head end of the low pressure cylinder is 26 pounds per square inch gauge hereinafter referred to as p.s.i.g. as compared to 0 p.s.i.g. on the rod end of the low pressure cylinder, a resulting pressure of 13 p.s.i.g. or thereabout would be developed in that area behind the piston rings 16 and 18. (See FIG. 2.) This is substantially one-half the pressure drop between the head end and rod end of cylinder 2. This developed pressure behind the piston rings 16 and 18 will urge piston rings 16 and 18 outwardly into engagement with the cylinder. Likewise the pressure developed in the head end of the high pressure cylinder 3 would result in pressure developed in the respective spring areas 4 of piston rings 17 and 19. With a pressure of 100 p.s.i.g. developed in the head end of the high pressure cylinder 3 and 26 p.s.i.g. developed in the rod end of the high pressure cylinder a resulting differential pressure of 74 p.s.i.g. exists between the rod and head end with a resulting effective pressure of 37 p.s.i.g. or thereabout being developed in that area behind piston rings 17 and 19. This pressure is substantially one-half the differential pressure between the head end and rod end of cylinder 3. The amount of wear of the respective rings is dependent on the pressure differential across the rings in the respective cylinders and accordingly those rings in the high pressure cylinder received more wear and were required to be replaced more frequently than those located in the low pressure cylinder, where the rings in both cylinders were made of the same carbon material. By providing the piston rings of different inherent properties in the high pressure cylinder from the piston rings in the low pressure cylinder, a balanced situation is reached wherein the piston rings of all cylinders wear uniformly and all rings are changed at the same time.

The non-lubricated compressors and pumps which use the carbon piston ring are particularly illustrative of the importance of varying the relative hardness to obtain the equal wear. Since these rings are non-lubricated they necessarily have a range of characteristics. Thus for example, in a high compressor cylinder, the piston rings, such as rings 17 and 19, would have a Rockwell X–15 number of 93 and a Shore Scleroscope number of 60 whereas the corresponding rings 16 and 18 in the low pressure cylinder would have a Rockwell X–15 number of 92 and a Shore Scleroscope number of 55. The deformation of these respective rings at their elastic limit (which is the breakpoint for carbon) in inches per inch would be .0181 to .0133 for compression and .0017 to .0009 for tension respectively. By employing carbon piston rings of the above hardnesses in the respective cylinders the wear characteristics are substantially equal, thus providing for a balanced wear in which only one down time is required, in which all rings would be changed simultaneously.

In addition to the hardness of the material which must be considered when selecting piston ring material, other variable properties of the carbon material that must be considered in determining the wear characteristics are density, transverse strength, compressive strength, tensile strength, elastic limit, initial grade of basic carbon itself, type and number of impregnations, and baking procedures. Among the impregnants are synthetic resin, chemical salt, plastics and metals. As a further example, data below based on a similar set of conditions as those above is given for two grades of carbons, wherein grade A is for the low pressure cylinder and grade B is for the high pressure cylinder.

|  | Grade A | Grade B |
| --- | --- | --- |
| Hardness | 55 Shore Scleroscope. | 60 Shore Scleroscope. |
| Density | 1.68 | 1.72. |
| Transverse Strength | 7,500 p.s.i. | 8,500 p.s.i. |
| Compressive Strength | 19,000 p.s.i. | 24,000 p.s.i. |
| Tensile Strength | 1,400 p.s.i. | 2,000 p.s.i. |
| Elastic Limit (Compression) | .0133 In./In. | .0166 In./In. |
| Elastic Limit (Tension) | .0010 In./In. | .0014 In./In. |
| Type Carbon | Carbon—Graphite. | Carbon—Graphite. |
| Type Impregnant | None | Synthetic Resin. |
| Number of Impregnations | None | One. |
| Percent Porosity | 15 | 9. |

As a result of this invention an improved segmental ring structure is provided whereby the useful life of the piston rings is substantially equal or matched, thus providing a better method of replacing the rings of a compressor. This process eliminates the sporadic shut down of a compressor or for ring repair. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or scope of the appended claims.

What I claim is:

1. A compressor comprising, a low pressure cylinder and a high pressure cylinder, pistons mounted in said cylinders respectively, means for reciprocating said pistons in said cylinders, piston rings of different relative hardness being located on said pistons, respectively, with the piston rings of the lesser hardness being located on the one of said pistons that is reciprocably mounted in the low pressure cylinder to provide uniform wear on said piston rings.

2. A dual stage compressor comprising, first and second stages having pistons reciprocably mounted therein respectively, piston rings of low and high relative hardness located on said pistons, respectively, with said low hardness rings mounted on said pistons in said first stage and said high hardness rings mounted on said pistons in said second stage, and said piston rings having equal wear characteristics.

3. A dual stage compressor comprising, a relatively low pressure cylinder and a high pressure cylinder, pistons reciprocably mounted in said cylinders, respectively, means for reciprocating said pistons in the respective cylinders, circumferential grooves in said pistons, carbon rings of different relative hardness located in said grooves of said pistons which rings slidably engage the walls of said cylinders, respectively, and the one of said pistons located in said low pressure cylinder having the carbon rings of less hardness relative to the carbon rings of greater hardness on the other of said pistons located in the high pressure cylinder to provide a balanced wear life on said carbon rings.

4. In a compressor having a plurality of stages, pistons reciprocably located in said respective stages, each of said pistons having piston rings respectively, said piston rings being of different relative hardness, the said piston rings of greater hardness being located in the said stages of greater pressure and those of less hardness being located in lower pressure stages respectively, and the relative hardness being so selected as to thereby match the wear characteristics of all of said rings respectively.

5. A compressor as set forth in claim 4 wherein said piston rings are of a carbonaceous type.

6. A multi-stage compressor comprising, a base frame, a first pressure cylinder and a second pressure cylinder supported by said frame, said second pressure cylinder being of smaller diameter than said first cylinder, an intercooler connecting said cylinders, pistons slidably mounted in said cylinders, valve means for reciprocating said pistons in said cylinders, valve means for controlling the fluid flow through said cylinders and intercooler, and piston rings mounted on said pistons to slidably engage the walls of said cylinders, the piston rings mounted on the piston located in said first pressure cylinder being selected to be of lesser hardness than the piston rings mounted on the piston located in the second pressure cylinder to provide uniform wear characteristics.

References Cited in the file of this patent
UNITED STATES PATENTS

| | | |
|---|---|---|
| 2,092,087 | Saharoff | Sept. 7, 1937 |
| 2,647,682 | Dolan | Aug. 4, 1953 |

UNITED STATES PATENT OFFICE
CERTIFICATE OF CORRECTION

Patent No. 3,072,317   January 8, 1963

Esper Kodra

It is hereby certified that error appears in the above numbered patent requiring correction and that the said Letters Patent should read as corrected below.

Column 4, line 52, for "reciprocally" read -- reciprocably --; column 5, line 4, strike out "valve".

Signed and sealed this 23rd day of July 1963.

(SEAL)
Attest:

ERNEST W. SWIDER
Attesting Officer

DAVID L. LADD
Commissioner of Patents